United States Patent [19]
McNaney

[11] 3,988,055
[45] Oct. 26, 1976

[54] LIGHT OPTIC DATA HANDLING SYSTEM

[76] Inventor: Joseph T. McNaney, 8548 Boulder Drive, La Mesa, Calif. 92041

[22] Filed: Aug. 26, 1975

[21] Appl. No.: 608,016

[52] U.S. Cl. .......................... 350/160 R; 332/7.51; 340/173 LM
[51] Int. Cl.² .......................................... G02B 5/23
[58] Field of Search ...... 350/160, 161, 162, 96 WG; 356/112; 332/7.51; 340/173 LM

[56] References Cited
UNITED STATES PATENTS

| | | | |
|---|---|---|---|
| 3,498,693 | 3/1970 | Fein et al. | 350/160 |
| 3,506,334 | 4/1970 | Korpel | 350/162 |
| 3,923,380 | 12/1975 | Hattori et al. | 332/7.51 |

Primary Examiner—David C. Nelms

[57] ABSTRACT

The invention includes light optic means for making available a series of arrays of information bearing light beams from a conventional light beam deflector at a series of secondary display positions on a light responsive medium so as to extend the resolution and beam deflection capabilities many times beyond the practical limits of the conventional light beam deflector.

3 Claims, 4 Drawing Figures

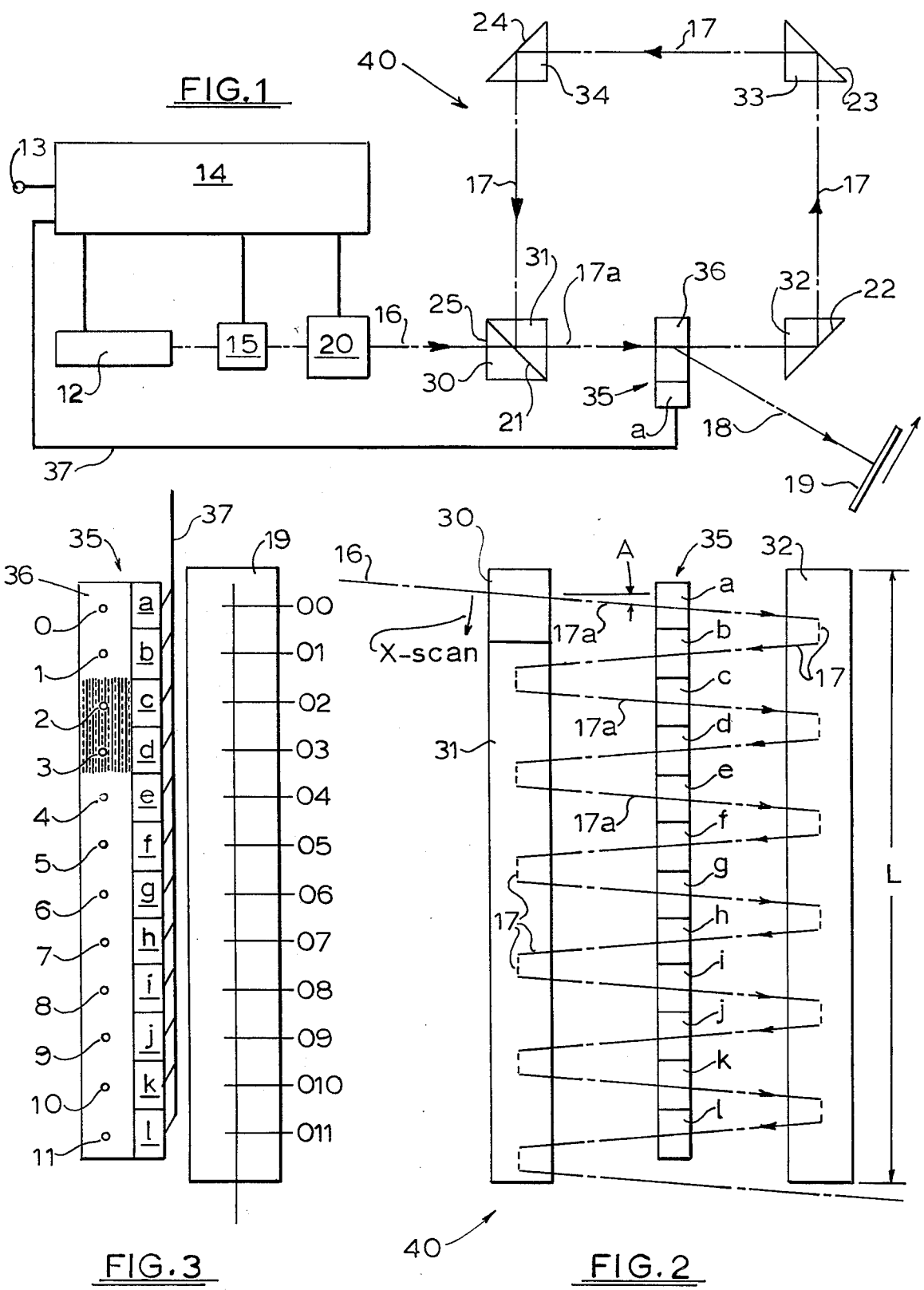

LIGHT OPTIC DATA HANDLING SYSTEM

SUMMARY OF THE INVENTION

Information bearing light beams are directed along a number of individually spaced light beam paths, by means of a primary beam deflecting or positioning means, toward a light admitting surface of the light optic data handling system of this invention. Upon entering the system each beam of an array stemming from the primary means is directed along a primary optical path within the system. In following a primary optical path each such beam undergoes a series of light reflections which will allow it to spiral its way through a length dimension of the system for the purpose of making available light thereof at any of a number of light output positions along the length dimension. By means of individually controllable OFF or ON conditioned light deflection control means at each of the output positions light available thereat may be directed along secondary paths beyond the limits of the system for a recording of the light beam information, or for other forms of communications, data control, etc. It is however an object of the invention to extend the resolution and deflection capabilities far beyond that of present day acousto-optic, electro-optic or other light beam positioning means.

The invention is illustrated, by way of example only, in the accompanying drawings and the description which follows when read in connection with the drawings will provide a better understanding of the objectives and other advantages of the invention.

BACKGROUND OF THE INVENTION

The invention herein relates to light optic data handling systems which utilize the concept, as set forth in my U.S. Pat. No. 3,872,451, of directing a beam of light by means of an array of at least three light reflecting surfaces along a primary optical path in the form of a spiral of plural revolutions. At a predetermined location along each revolution the beam of light will be made available for a redirecting of light therefrom along a corresponding one of a plurality of secondary paths stemming respectively, from said locations, each location representative of an output position of the system. Electro optic material light reflection control means are included at each output position for effecting, selectively, a frustrating of light reflections and thereupon redirecting light away from a selected one of the output positions.

In a co-pending application Ser. No. 566,916 filed Apr. 10, 1975, a further embodiment of an electro optic material light reflection control means is disclosed including the use of a layer of electro optic material in combination with an interdigital electrode assembly joined to the surface thereof at each output position. In response to a d.c. voltage between first and second electrodes of the assembly periodic strains are established in the layer of material and resulting periodic variations of index of refraction therein are utilized in the controlling and redirecting of light along a secondary path stemming from a selected one of a plurality of output positions.

In another co-pending application Ser. No. 580,586 filed May 27, 1975, the material coincident with the light reflection control interface of each output position exhibits piezoelectric effects in response to the influence of an electric field. Interdigital electrode assemblies are supported closely adjacent the interface at each output position and in response to a d.c. voltage between the electrodes of a given assembly the resulting periodic strains in the piezoelectric material, followed by a spatial change in the index of refraction of materials coincident with the interface thereof, effects a redirecting of light away from a corresponding one of the output positions.

In still another co-pending application Ser. No. 590,105 filed June 15, 1975, the concept set forth in the above noted U.S. Pat. No. 3,872,451 is again utilized, but in combination with an initial beam positioning system means for allowing a single source beam of light to be directed along a plurality of individual input paths to the system, forming, for example, 7 × 9 arrays of beams from which message characters may be formed and presented to the system. It is also an object of the invention to extend the beam deflection and resolution capabilities beyond the practical limits of those of present day beam positioning system means.

In yet another co-pending application Ser. No. 593,874 filed July 7, 1975 the concept set forth in the above U.S. Pat. No. 3,872,451 is again utilized in a system means for extending the beam deflection and resolution capabilities of the present day beam positioning system means. Unlike the foregoing co-pending applications, however, the invention herein includes the use of acoustic wave generating means at each of the output positions of the system for propagating an acoustic wave in light conducting media at each position for controlling, selectively, the redirect of light along a secondary path stemming from a corresponding one of the output positions.

The invention in the present application includes the use of an alternative means of directing light along a selected output path from the system. Light reflection control means is positioned intermediate two succeeding light reflecting surfaces and in the path of the series of beams which spiral their way through the system as opposed to being coincident with a reflecting surface of the array of surfaces in the system.

BRIEF DESCRIPTION OF THE DRAWINGS

FIGS. 1 and 2 are first and second diagrammatic presentations of a system embodiment of the invention;

FIG. 3 is a showing of a portion of the system embodiment for a more detailed understanding thereof;

DESCRIPTION OF THE INVENTION

Figure 4:
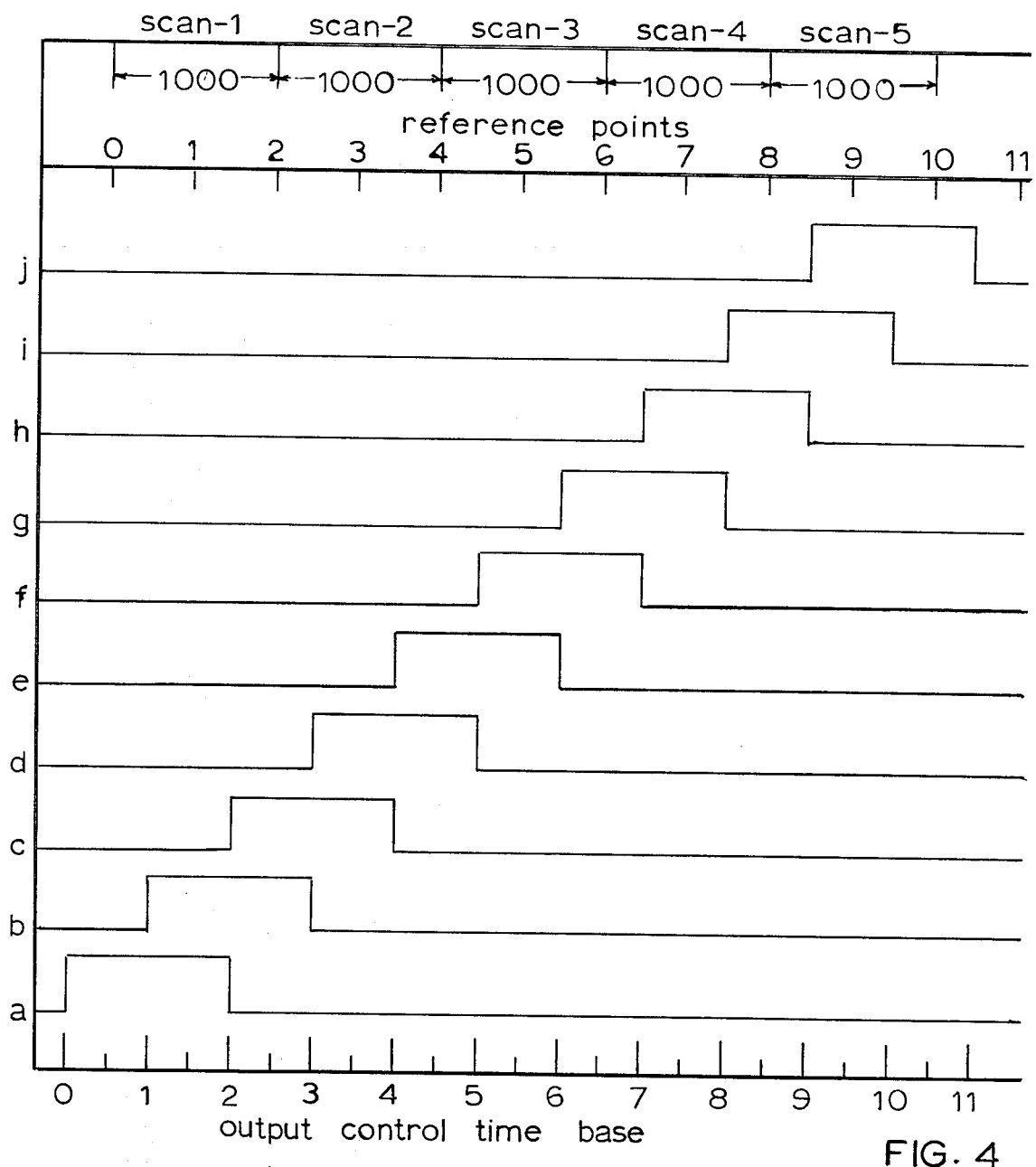
FIG. 4 is a time base chart which will be referred to in the description of the system embodiment.

Referring now to FIGS. 1 and 2, this system embodiment of the invention illustrates, for example, the use of a first light beam deflector means, or beam positioner, 20 and a second light beam reflector means, or distributor, 40. The first deflector means 20 represents in block diagram an acousto-optical system, for example, shown in the optical path of light from a laser source 12 and a light beam modulator 15, also in the form of block diagrams, each of which are of the type well known in the art. In response to signals from control circuitry 14, and to signals applied to an input terminal 13, the modulator 15 will control the intensity of light from the source 12 and the system 20 will control the deflection of beams of such light in, for example, an X-scan mode.

The distributor 40 utilizes, for example, an array of light reflector prisms 31, 32, 33 and 34, each having a length dimension L. Closely adjacent to the surface 21 of the prism 31, and at but one end thereof, there is a prism 30 presenting an index of refraction lower than that of the prism 31. Light from the source 12 is directed along an initial path 16, at a predetermined angle A, toward a light admitting surface 25 of the distributor 40. Upon entry of a beam of light along the path 16 the light within the distributor 40 will be directed along, what will be referred to as, a primary optical path 17 by means of an array of light reflecting surfaces 21, 22, 23 and 24. Upon the passage of light through the interface 21 of the prisms 30 and 31 it will be reflected first by the surface 22 and thereupon by the surfaces 23, 24, 21, then again by the surfaces 22, 23, and so on. Because of the angle of entry A the light will follow a series of 360° primary optical paths, each displaced one with respect to the other in the direction of the length dimension L, until the light finds passage through the opposite end of the system 40. The angle A at which beams of light are shown to be entering surface 25 is of course exaggerated so as to simplify descriptions of the invention. All other dimensions in the drawing have been exaggerated for similar reasons.

The primary optical path 17 which spirals its way through the system of reflecting surfaces includes the sections 17a thereof, following the left to right course across the drawing in FIGS. 1 and 2. An acousto-optical light beam deflection system 35 is shown positioned in the way of light directed along the section 17a. However, that part of the deflection system 35 positioned in the way of light is comprised of a light conducting material, such as lithium niobate or lithium tantalate, for example, and will be referred to as medium 36, through which the light will pass along the sections 17a of the primary optical path. FIG. 3 shows the medium 36 extending essentially the length of dimension L, and along the surface thereof is shown a series of reference points 0 through 11, and opposite each reference point there is shown a block diagram representation of a transducer means, a through l, each of which are intimately joined to the medium 36 and connected through circuit means 37 to corresponding OFF or ON conditioning means of the control circuitry 14. Upon the effecting of an ON conditioned transducer means a generation of acoustic waves will result in that portion of the medium 36 opposite the ON conditioned transducer means, as exemplified opposite transducer means c and d by a series of straight and doted lines. A diffraction grating resulting from these compressional strains allows beams of light to be deflected away from the primary path 17a and along one or more secondary paths 18 toward, for example, a record medium 19 which may be movable in the direction of the arrow.

FIG. 3 views the deflection system 35 and the record medium 19 from the direction of the beams of light incident thereupon, and for purposes of describing the invention a series of reference points 00 through 011 are noted on the surface of the record medium. High quality recording of information bearing light beams is an object of the invention and a line array of such beams will be directed along a series of input paths, stemming from the deflector means 20, toward the admitting surface 25. The deflector means 20 can be of a type providing 1000 elements per line scan extending from the initial path 16 and scanned in the direction of the length dimension of the surface 25, noted herein as the x-scan. Referring to the chart of FIG. 4 reference points 0 through 11 therein correspond to the reference points 0 through 11 in FIG. 3. Utilizing a possible 1000 input paths the first path thereof will correspond to the initial path 16 and to the 0 reference point on the medium 36, which, when deflected thereby, will coincide with the 00 reference point on the medium 19. The five hundredth path will correspond to the number 1 reference point on the medium 36 and a beam deflected therefrom will coincide with the 01 reference point on the medium 19. The ten hundredth path will correspond to the number 2 reference point on the medium 36 and a beam deflected therefrom will coincide with the 02 reference point on the medium 19. In the chart of FIG. 4 the use of an initial 1000 input positions is referred to as scan-1.

Under a controlled OFF conditioning of the transducer means a through l, light along each of the initial 1000 input paths will be deflected within the system 40 until having reached, and escaped through, the lower end of the system 40. Under a controlled ON conditioning of the transducers a and b during this scan-1 information bearing beams of light will have been recorded on the record medium 19 between reference points 00 and 02. The controlled OFF or ON conditioning of the transducer means, however, will be in accordance with the output control time base in the chart which extends from scan-1 through scan-5. Instead of providing but a single transducer in connection with light beam deflection control for each series of 1000 input paths it is an object of this invention to provide at least two overlapping deflection control functions for each line scan as the means of avoiding the requirement of most difficult close tolerances in the fabrication of a light beam deflection system 35.

In the chart it will be noted that an ON conditioned control means a will have been established prior to the start of the first series of 500 input paths to be scanned under scan-1 and said ON conditioning will have been maintained until the start of the second series of 500 input paths to be scanned under scan-1, then effect the turning OFF of said control means a prior to the completing the second series of 500 input paths to be scanned under scan-1. It will be noted that an ON conditioned control means b will have been established prior to the start of the second series of 500 input paths to be scanned under scan-1, then effecting the turning OFF of said control means b upon completing the second series of 500 input paths to be scanned under scan-1. It will be noted that an ON conditioned control means c will have been established prior to the start of the third series of 500 input paths to be scanned under scan-2. This system of controlled OFF or ON conditioned light beam deflectors 35 will continue through scan-2, scan-3. etc., until a line of information has been recorded on the medium 19. Then the recording of succeeding lines of information will continue until the recording of messages have been completed.

As stated herein the medium 36 of the light beam deflection system 35 can be of a light conducting material such as lithium niobate or lithium tantalate, for example, however the medium 36 material may be selected from a variety of other piezoelectric effect materials and the block diagram presentations of transducer means a through l may be in the form of any one of a number of well known interdigital electrode array transducer means or single-phase electrode array transducer means. The deflection system 35 can, of course, be comprised of any one of a number of well known piezoelectrically driven bulk wave transducer means.

In each such event, however, the objective is to allow light beams directed along the primary optical paths 17a to be selectively redirected away from such paths and along output paths 18 stemming from the distributor means 40. The particular orientation of the system 35 in relation to the primary optical paths 17a will be determined by the type of transducer means utilized and the operational requirements thereof.

It should be understood by those skilled in the arts pertaining to the construction and application possibilities of the invention herein set forth that the embodiments included herein illustrate in a very limited sense the usefulness of the invention, and that the invention includes other modifications and equivalents as they may be seen by those skilled in the arts, but still being within the scope of the appended claims.

I claim:

1. light optic data handling system comprising:
   a. a source of light and means for directing an individual beam of light therefrom along a primary optical path within said system so as to establish an availability of light of said beam at a plurality of predetermined locations along said path for a redirecting of said light from a selected one of said locations and thereupon along a corresponding one of a plurality of secondary optical paths stemming, respectively, from said locations, each said location representative of an output position of said system;
   b. said means including an array of at least three light reflecting surfaces, each surface presenting a length dimension and each surface positioned substantially parallel one with respect to the other in a predetermined spaced apart relationship, said array of surfaces angularly oriented so as to establish an optical relationship one with respect to the other for allowing said beam of light to be directed along said primary path forming a helix of plural revolutions, each revolution including at least one of said locations at which said light will be made available for said redirecting thereof along a corresponding secondary path;
   c. a plurality of individually controlled OFF or ON conditioned light beam deflection control means positioned intermediate two succeeding surfaces of said array and extending along said length dimension thereof, the position of each of said control means coinciding, respectively, with each of said output positions;
   d. means for allowing said beam of light to be directed along said helix of plural revolutions in response to an OFF conditioned control means at each of said output positions;
   e. means for establishing a diffraction grating coincident with the control means at a selected one of said output positions in response to an ON conditioned control means at said one output position for effecting said redirecting of light along a secondary path stemming from said one output position.

2. A light optic data handling system according to claim 1 wherein each said light beam deflection control means includes a light conducting medium and acoustic wave transducer means intimately associated therewith for establishing said diffraction grating in said medium in response to an ON conditioned control means.

3. A light optic data handling system comprising:
   a. a source of light and means for directing an individual beam of light therefrom along a primary optical path within said system so as to establish an availability of light of said beam at a plurality of predetermined locations along said path for a redirecting of said light from a selected one of said locations to, and along, a corresponding one of a plurality of secondary optical paths stemming, respectively, from said locations each said location representative of an output position of said system;
   b. said means including an array of at least three light reflecting surfaces, each surface presenting a length dimension and each surface positioned substantially parallel one with respect to the other in a predetermined spaced apart relationship, said array of surfaces each angularly oriented so as to establish an optical relationship one with respect to the other for allowing said beam of light to be directed along said primary path forming a helix of plural revolutions, each revolution including at least one of said predetermined locations representative of an output position at which said light will be made available for said redirecting thereof along a corresponding one of said secondary paths;
   c. a plurality of individually controlled OFF or ON conditioned light beam deflection control means positioned intermediate two succeeding surfaces of said array of surfaces, each said control means occupying positions extending along said length dimension of said array and the position of each of said control means coinciding, respectively, with each of said output positions;
   d. means for allowing said beam of light to be directed along said helix of plural revolutions in response to an OFF conditioned control means at each of said output positions;
   e. a plurality of acoustic wave generator means;
   f. a source of electrical signals for driving said acoustic wave generator means and control circuitry means for extending, selectively, the influence of said electrical signals to said generator means;
   g. each said control means including a light conducting medium, said medium coinciding, respectively, with each said output position, and at least one of said acoustic wave generator means operatively associated with said light conducting medium;
   h. means for limiting the redirecting of light, selectively, from but one of said output positions at any one time, said last stated means including the extending of said influence to an acoustic wave generator means adjacent a selected one of said output positions, thereby establishing an ON conditioned control means at said selected position, for propagating an acoustic wave in said light conducting medium and effecting the redirecting of light along a secondary path stemming from said selected one of said output positions.

* * * * *